(12) United States Patent
Takatsuji (10) Patent No.: US 12,088,197 B2
(45) Date of Patent: Sep. 10, 2024

(54) ELECTRONIC CIRCUIT

(71) Applicant: Murata Manufacturing Co., Ltd., Kyoto-fu (JP)

(72) Inventor: Hiroyuki Takatsuji, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 145 days.

(21) Appl. No.: 17/833,640

(22) Filed: Jun. 6, 2022

(65) Prior Publication Data

US 2022/0302832 A1 Sep. 22, 2022

Related U.S. Application Data

(63) Continuation of application No. PCT/JP2020/042640, filed on Nov. 16, 2020.

(30) Foreign Application Priority Data

Dec. 17, 2019 (JP) .................................. 2019-227510

(51) Int. Cl.
*H02M 3/155* (2006.01)
*H02M 1/44* (2007.01)
(Continued)

(52) U.S. Cl.
CPC ............. *H02M 3/155* (2013.01); *H02M 1/44* (2013.01); *B60L 2210/10* (2013.01); *H02M 1/14* (2013.01); *H02M 3/003* (2021.05)

(58) Field of Classification Search
CPC ........ H02M 1/123; H02M 1/126; H02M 1/14; H02M 1/143; H02M 1/44; H02M 3/155–1588; B60L 2210/10
See application file for complete search history.

(56) References Cited

U.S. PATENT DOCUMENTS

| 11,456,675 | B2* | 9/2022 | Katsube | ................... | H02M 1/14 |
| 2013/0106255 | A1* | 5/2013 | Tamura | ................. | H02M 7/003 |
| | | | | | 310/68 D |

(Continued)

FOREIGN PATENT DOCUMENTS

| JP | 2000-40637 A | 2/2000 |
| JP | 2017-169431 A | 9/2017 |

(Continued)

OTHER PUBLICATIONS

International Search Report issued in PCT/JP2020/042640; mailed Dec. 8, 2020.

(Continued)

*Primary Examiner* — Fred E Finch, III
(74) *Attorney, Agent, or Firm* — Studebaker & Brackett PC (57) ABSTRACT

An electronic circuit includes a common mode choke coil (CMCC), a first capacitor and a second capacitor as a pair of line bypass capacitors, and a DC-DC converter coupled to a power line and also to a ground line coupled to a ground of a substrate. The first capacitor is coupled to the power line between the CMCC and the DC-DC converter. The first capacitor is coupled between the power line and a metal housing. The second capacitor is coupled to the ground line between the CMCC and the DC-DC converter. The second capacitor is coupled between the ground line and the metal housing.

3 Claims, 7 Drawing Sheets

(51) Int. Cl.
    *H02M 3/00*     (2006.01)
    *H02M 1/14*     (2006.01)

(56)     References Cited

U.S. PATENT DOCUMENTS

| | | | |
|---|---|---|---|
| 2016/0204754 A1* | 7/2016 | Kawamura | H03H 1/0007 |
| | | | 333/184 |
| 2017/0288575 A1* | 10/2017 | Kitada | H02M 1/12 |
| 2018/0007785 A1* | 1/2018 | Kamikura | H02M 7/48 |
| 2018/0152098 A1* | 5/2018 | Shin | H02M 7/003 |
| 2019/0296637 A1* | 9/2019 | Li | H02P 27/06 |
| 2020/0079233 A1* | 3/2020 | Kim | B60L 50/00 |

FOREIGN PATENT DOCUMENTS

| | | |
|---|---|---|
| JP | 2017-184391 A | 10/2017 |
| JP | 2019-004634 A | 1/2019 |
| WO | 2012/004860 A1 | 1/2012 |

OTHER PUBLICATIONS

Maeda, Tsuyoshi, et al., Consideration for Reducing the Noise Currents through Signal and Ground Patterns of PCB for Vehicle-Mounted Electronic Equipment, Proceedings of the 26th Spring Conference of the Japan Institute of Electronics Packaging, The Japan Institute of Electronics Packaging, Session ID 8A-08, vol. 26, p. 65-68, Mar. 2012.

\* cited by examiner

ELECTRONIC CIRCUIT

CROSS-REFERENCE TO RELATED APPLICATIONS

This application claims benefit of priority to International Patent Application No. PCT/JP2020/0042640, filed Nov. 16, 2020, and to Japanese Patent Application No. 2019-227510, filed Dec. 17, 2019, the entire contents of each are incorporated herein by reference.

BACKGROUND

Technical Field

The present disclosure relates to an electronic circuit configured to be used in a car-mounted device including a non-isolated DC-DC converter.

Background Art

When an electronic circuit for noise control is used in a car-mounted device in combination with a substrate and a metal housing, the ground of the substrate and the metal housing are short-circuited in a known configuration, as described, for example, in Maeda and Iida, "Consideration for Reducing the Noise Currents through Signal and Ground Patterns of PCB for Vehicle-Mounted Electronic Equipment", Proceedings of the 26th Spring Conference of the Japan Institute of Electronics Packaging, The Japan Institute of Electronics Packaging, 8A-08, March 2012 (hereinafter "Non Patent Document 1"). In the electronic circuit described in Non Patent Document 1, a common mode choke coil is provided at a position across a power line and a ground line to suppress conducted emissions.

SUMMARY

In the electronic circuit described in Non Patent Document 1, the ground of the substrate and the metal housing are short-circuited in a direct-current (DC) circuit. In this case, the ground of the substrate is coupled via the metal housing to, for example, a vehicle body at a reference potential, and as a result, the ground potential at the substrate is maintained. This, however, makes it impossible to couple a line bypass capacitor (Y-capacitor) to the ground of the substrate for the purpose of noise control. Consequently, common mode noise is reduced by only the common mode choke coil.

When the level of common mode noise is relatively high, the common mode noise is not always reduced sufficiently. When only a common mode choke coil of small inductance can be used due to limitations of current and size, reduction of common mode noise may also be insufficient.

Accordingly, the present disclosure provides an electronic circuit that can enhance the effects of common mode noise reduction.

According to an embodiment of the present disclosure, an electronic circuit is configured to be used in a car-mounted device including a substrate, a metal housing, and a non-isolated DC-DC converter. The metal housing is coupled to reference ground. A ground of the substrate is not directly coupled to the metal housing. The non-isolated DC-DC converter is coupled to a power line and also to a ground line coupled to the ground of the substrate. A first capacitor is coupled between the power line and the metal housing. A second capacitor is coupled between the ground line and the metal housing.

An embodiment of the present disclosure can enhance the effects of common mode noise reduction.

DETAILED DESCRIPTION

Hereinafter, electronic circuits according to embodiments of the present disclosure will be described in detail with reference to the accompanying drawings. In the following embodiments, the term "couple" means electrical coupling.

Figure 1:
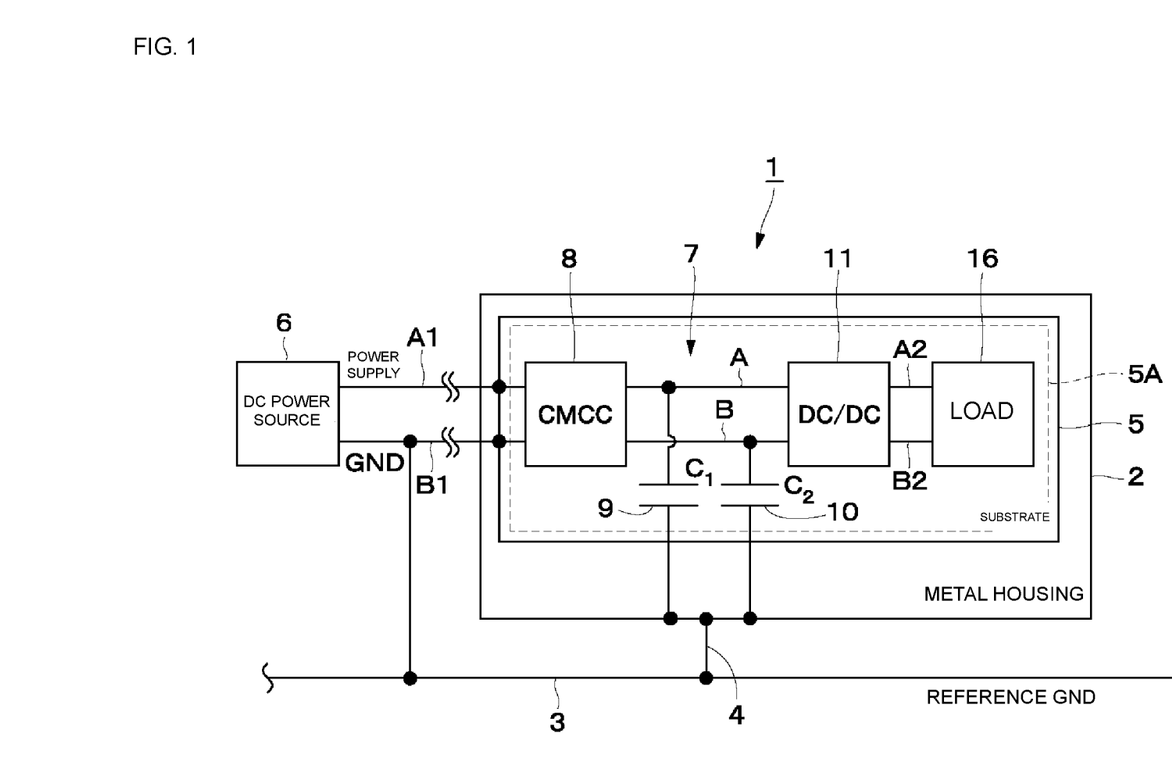
FIG. 1 is a schematic diagram illustrating a car-mounted device using an electronic circuit according to a first embodiment.

FIGS. 1 to 6 illustrate an electronic circuit 7 according to a first embodiment of the present disclosure. FIG. 1 illustrates an overall configuration of a car-mounted device 1 including the electronic circuit 7. The car-mounted device 1 constitutes, for example, an automotive navigation system. As illustrated in FIG. 1, the car-mounted device 1 is provided with the electronic circuit 7 for reducing common mode noise (noise) caused between a direct-current (DC) power source 6, which is on the input-side of the electronic circuit 7, and a load 16, which is on the output-side of the electronic circuit 7. Specifically, the car-mounted device 1 includes a metal housing 2, a substrate 5, the DC power source 6, the electronic circuit 7, a DC-DC converter 11 forming a non-isolated DC-DC converter, and the load 16.

The metal housing 2 is formed as, for example, a box by using a conductive metallic material. The metal housing 2 is coupled to, for example, a vehicle body (body) of an automobile in which the vehicle body is considered as reference ground 3. The metal housing 2 and the reference ground 3 are electrically coupled to each other by a lead 4. The metal housing 2 and the reference ground 3 may be coupled directly to each other by, for example, a fixing bolt. The metal housing 2 accordingly has a ground potential. The substrate 5 having components such as the electronic circuit 7 is housed in the metal housing 2.

The substrate 5 is, for example, a flexible substrate (flexible printed circuit board) formed as a plate by using an insulating material, such as a resin material. The substrate 5 is fixed to the metal housing 2 in the state in which the metal housing 2 and a ground 5A (ground electrode) of the substrate 5 are not coupled directly to each other. The substrate 5 may be a single-layer substrate formed by a single insulating layer or a multilayer substrate formed by a stack of insulating layers. The substrate 5 is not limited to a flexible substrate, and may be a rigid substrate. The material of the substrate 5 is not limited to a resin material, and may be, for example, a ceramic material, a glass substrate, or a liquid crystal polymer. The ground 5A is disposed on, for example, a first major surface or second major surface of the substrate 5. When the substrate 5 is formed by a multilayer substrate, the ground 5A may be formed in, for example, an intermediate layer of the substrate 5.

The electronic circuit 7, the DC-DC converter 11, and the load 16 are disposed on the substrate 5. The DC-DC converter 11 and the load 16 are disposed on, for example, the first major surface of the substrate 5. The DC power source 6 supplies a DC input voltage to the DC-DC converter 11 through an input-side power line A1 and an input-side ground line B1. The DC-DC converter 11, for example, steps down the DC input voltage and outputs a DC output voltage to supply the DC output voltage to the load 16. The load 16 operates based on the DC output voltage from the DC-DC converter 11. The load 16 is coupled to the DC-DC converter 11 by an output-side power line A2 and an output-side ground line B2.

The input-side power line A1 and the input-side ground line B1 are formed by, for example, electric wires of a wire harness coupling the DC power source 6 and the car-mounted device 1 to each other. The output-side power line A2 and the output-side ground line B2 are formed by, for example, conductor patterns formed on the first major surface of the substrate 5.

The DC power source 6 is disposed outside the metal housing 2. The DC power source 6 is, for example, a battery installed in an automobile and supplies a predetermined constant DC input voltage. A positive terminal of the DC power source 6 is coupled to a power line A of the substrate 5 via the input-side power line A1. A negative terminal of the DC power source 6 is coupled to a ground line B of the substrate 5 via the input-side ground line B1.

The electronic circuit 7 is coupled to the power line A and the ground line B of the substrate 5. The power line A and the ground line B are formed by, for example, conductor patterns formed on the first major surface of the substrate 5.

Figure 2:
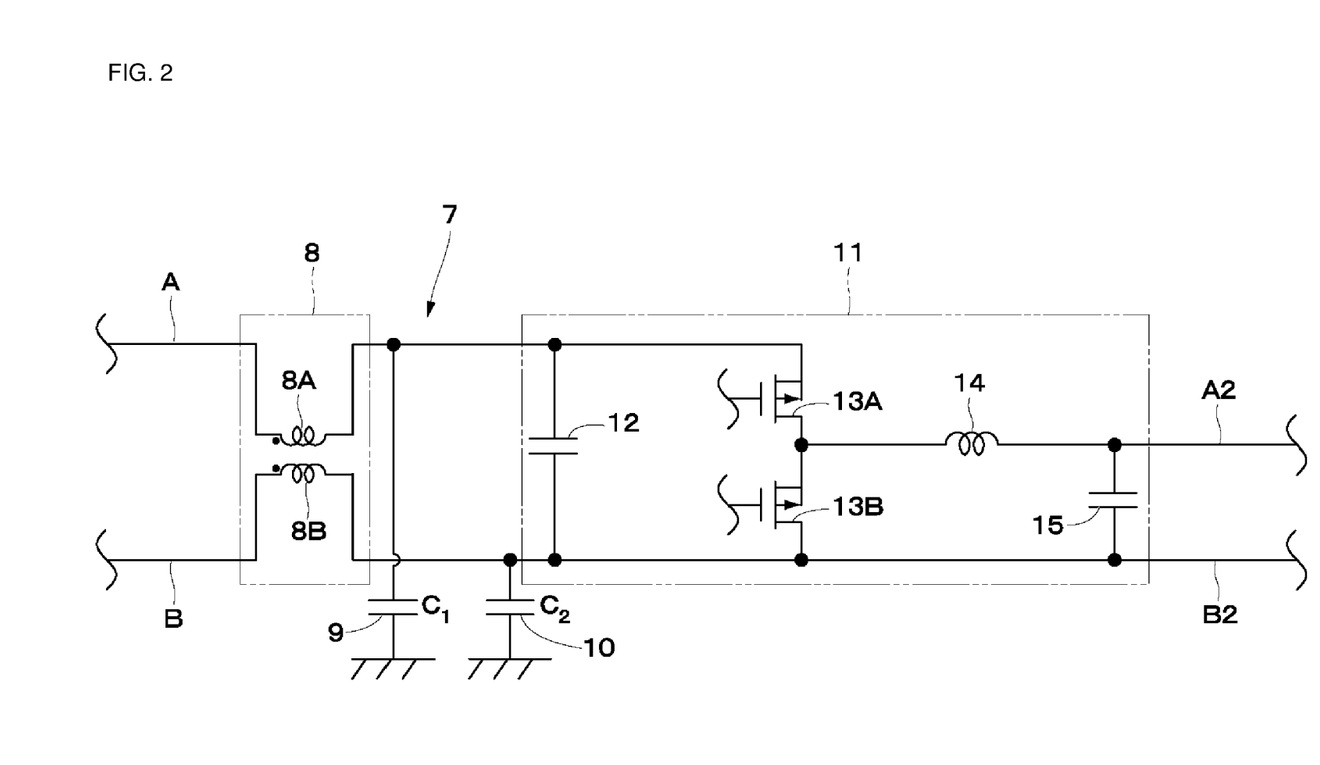
FIG. 2 is a circuit diagram illustrating the electronic circuit in FIG. 1 and a non-isolated DC-DC converter.

As illustrated in FIG. 2, the electronic circuit 7 includes a common mode choke coil 8 (hereinafter referred to as the CMCC 8) serving as a component for noise control and also includes a first capacitor 9 and a second capacitor 10 that are a pair of line bypass capacitors (Y-capacitors) serving as components for noise control. The DC power source 6 is coupled to the input-side of the electronic circuit 7. The DC-DC converter 11 is coupled to the output-side of the electronic circuit 7. The electronic circuit 7 suppress common mode noise caused between the DC power source 6 and the DC-DC converter 11, by using the CMCC 8, and the first capacitor 9 and the second capacitor 10.

Specifically, the CMCC 8 is provided between the DC power source 6 and the DC-DC converter 11. The CMCC 8 is disposed at a position across the power line A and the ground line B to reduce common mode noise flowing in the power line A and the ground line B. The CMCC 8 is disposed closer to the input-side (that is, the DC power source 6 side) than the first capacitor 9 and the second capacitor 10. The CMCC 8 includes a first choke coil 8A coupled to the power line A and a second choke coil 8B coupled to the ground line B. The inductance of the CMCC 8 is set to, for example, about 2 μH.

Figure 3:
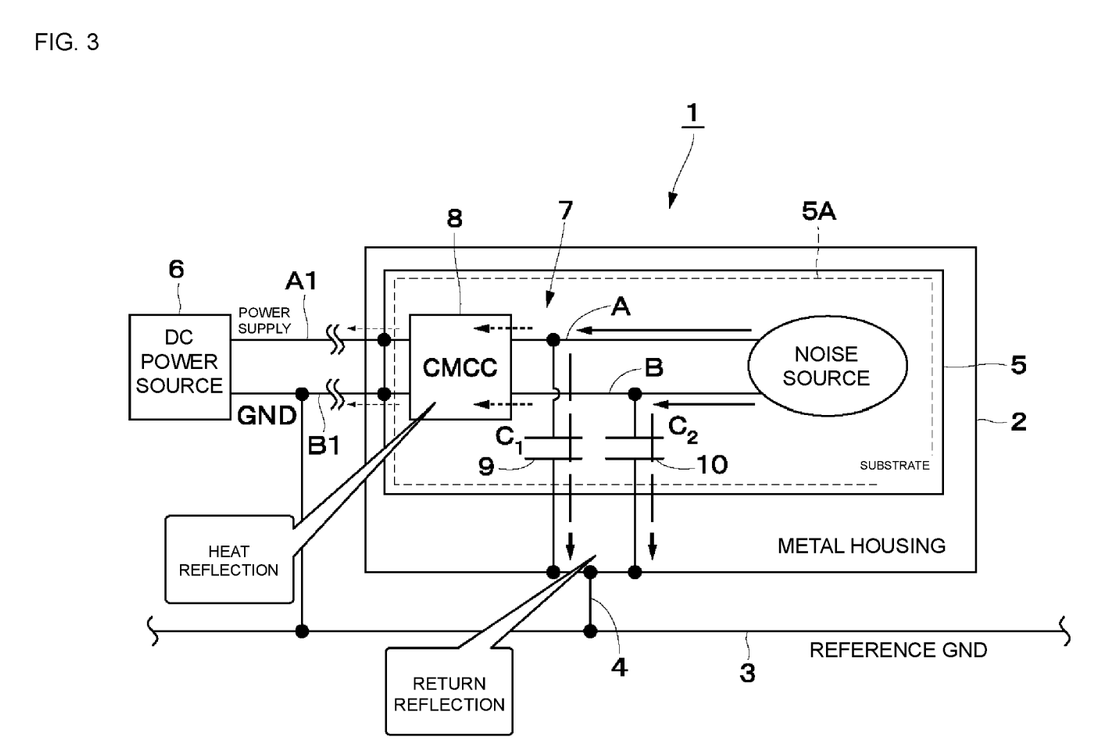
FIG. 3 is a schematic diagram illustrating effects of noise reduction according to the first embodiment.

As illustrated in FIG. 3, the CMCC 8 reflects common mode noise or converts common mode noise into heat by using the difference between the impedance (common-mode impedance) of the CMCC 8 and the common-mode characteristic impedance of the power line A and the ground line B, that is, the characteristic impedance of wires. As such, the CMCC 8 reduces common mode noise.

More specifically, the CMCC 8 does not operate as an inductor in the differential mode (normal mode) in which current flows in different directions in the power line A and the ground line B. The impedance (normal-mode impedance) of the CMCC 8 is thus lower in the differential mode.

By contrast, the CMCC 8 operates as an inductor in the common mode in which current flows in the same direction in both the power line A and the ground line B. The impedance of the CMCC 8 is higher in the common mode. The CMCC 8 accordingly reduces common mode noise.

The first capacitor 9 is coupled to the power line A between the CMCC 8 and the DC-DC converter 11. The first capacitor 9 is coupled (shunt-coupled) between the power line A and the metal housing 2. The first capacitor 9 is coupled to the reference ground 3 via the metal housing 2. The first capacitor 9 reduces common mode noise flowing in the power line A. The first capacitor 9 returns to the reference ground 3 the common mode noise flowing in the power line A.

The second capacitor 10 is coupled to the ground line B between the CMCC 8 and the DC-DC converter 11. The second capacitor 10 is coupled (shunt coupled) between the ground line B and the metal housing 2. The second capacitor 10 is coupled to the reference ground 3 via the metal housing 2. The second capacitor 10 reduces common mode noise flowing in the ground line B. The second capacitor 10 returns to the reference ground 3 the common mode noise flowing in the ground line B. The second capacitor 10 may be coupled between the ground 5A of the substrate 5 and the metal housing 2.

Here, a capacitance C1 of the first capacitor 9 is equal to a capacitance C2 of the second capacitor 10 (C1=C2). The capacitance C1 of the first capacitor 9 and the capacitance C2 of the second capacitor 10 are set to a value of, for example, about 1000 pF (about 10000 to 100 pF). The capacitance C1 of the first capacitor 9 may be different from the capacitance C2 of the second capacitor 10 (C1≠C2).

The DC-DC converter 11 is, for example, a DC-DC converter installed in the car-mounted device 1 of, for example, an automotive navigation system and coupled to a 12-V battery. In this case, the DC-DC converter 11 steps down a supply voltage (12 V) of the DC power source 6 to a drive voltage (for example, 5 or 3.3 V) to be used by the load 16 operating as, for example, a controller. The DC-DC converter 11 is not limited to a DC-DC buck converter coupled to a 12-V battery, and may be, for example, a 48 V/12 V DC-DC buck-boost converter installed in a vehicle of a 48-V mild hybrid (48 V-Mild-HEV).

The DC-DC converter 11 is coupled to the power line A and also to the ground line B. The ground line B is coupled to the ground 5A of the substrate 5. The DC-DC converter 11 is disposed at a position across the power line A and the ground line B. The DC-DC converter 11 is disposed between the CMCC 8 and the load 16. The DC-DC converter 11 steps down a DC input voltage inputted from the DC power source 6 to output a DC output voltage in accordance with the duty ratio in an on-and off cycle of a first switching element 13A and a second switching element 13B. The DC-DC converter 11 supplies to the load 16 the DC output voltage as a drive voltage for the load 16. More specifically, as illustrated in FIG. 2, the DC-DC converter 11 includes an input-side capacitor 12, the first switching element 13A and the second switching element 13B, a coil 14, and an output-side capacitor 15.

The input-side capacitor 12 is coupled in parallel with the DC power source 6. Specifically, a first end of the input-side capacitor 12 is coupled to the power line A. A second end of the input-side capacitor 12 is coupled to the ground line B.

The first switching element 13A and the second switching element 13B may be implemented by, for example, field-effect transistors (FETs). The first switching element 13A and the second switching element 13B may be implemented by, for example, bipolar transistors.

The first switching element 13A is coupled to the power line A between the first choke coil 8A of the CMCC 8 and the coil 14. The drain of the first switching element 13A is coupled to the first choke coil 8A of the CMCC 8. The source of the first switching element 13A is coupled to the first end of the coil 14. The second switching element 13B is coupled between a node between the first choke coil 8A and the coil 14, and the ground line B. The drain of the second switching element 13B is coupled to the source of the first switching element 13A and also to the first end of the coil 14. The source of the second switching element 13B is coupled to the ground line B. A diode may be used instead of the second switching element 13B.

The gate of the first switching element 13A and the gate of the second switching element 13B are coupled to a control circuit (not illustrated in the drawing) for controlling the duty ratio of the first switching element 13A and the second switching element 13B. In accordance with this duty ratio, this control circuit steps down a DC input voltage inputted from the DC power source 6 to a DC output voltage.

The first end of the coil 14 is coupled to a node between the source of the first switching element 13A and the drain of the second switching element 13B. A second end of the coil 14 is coupled to the load 16. The DC output voltage is thus supplied through the coil 14 to the load 16. At this time, the DC output voltage is smoothed by the output-side capacitor 15 and supplied to the load 16. A first end of the output-side capacitor 15 is coupled to the power line A. A second end of the output-side capacitor 15 is coupled to the ground line B.

The electronic circuit 7 according to the present embodiment has the configuration described above. The following describes an operation of the electronic circuit 7.

The input-side of the electronic circuit 7 is coupled to the DC power source 6. The output-side of the electronic circuit 7 is coupled to the DC-DC converter 11. The DC power source 6 supplies a DC input voltage through the electronic circuit 7 to the DC-DC converter 11. The DC-DC converter 11 steps down a DC input voltage to output a DC output voltage in accordance with the duty ratio in an on-and off cycle of a first switching element 13A and a second switching element 13B. This DC output voltage is smoothed by the output-side capacitor 15 and supplied to the load 16.

The first switching element 13A and the second switching element 13B of the DC-DC converter 11 perform switching operations. As a result, a high-frequency noise signal may flow in the power line A and the ground line B. The noise signal may be in the common mode, in which signals flow in the same direction in the power line A and the ground line B, or the normal mode (differential mode), in which signals flow in opposite directions in the power line A and the ground line B. This means that the current in the first choke coil 8A and the current in the second choke coil 8B flow in the same direction in the common mode, whereas the current in the first choke coil 8A and the current in the second choke coil 8B flow in different directions in the normal mode.

To address this problem, the electronic circuit 7 includes the CMCC 8, and the first capacitor 9 and the second capacitor 10. As illustrated in FIG. 3, the first capacitor 9 and the second capacitor 10 reflect or return common mode noise caused between the DC power source 6 and the load 16. More specifically, because the first capacitor 9 and the second capacitor 10 are disposed between the CMCC 8 and the DC-DC converter 11, the first capacitor 9 and the second capacitor 10 mainly reduce the common mode noise caused in the DC-DC converter 11. Additionally, because the first capacitor 9 and the second capacitor 10 are provided, the characteristic impedance of wires (the power line A and the ground line B) can be decreased. As the characteristic impedance of wires decreases, the effects of noise reduction by the CMCC 8 enhances. As such, a synergy effect is achieved as follows: this configuration increases the difference in impedance between the CMCC 8 and wires with respect to common mode noise; and this in turn facilitates reduction of common mode noise by the CMCC 8. This means that, because the CMCC 8, and the first capacitor 9 and the second capacitor 10 are both provided, the effects of reduction of common mode noise (noise) can be enhanced.

Incidentally, Japanese Unexamined Utility Model Registration Application Publication No. 61-205290 discloses a power supply circuit including an isolated DC-DC converter. With an isolated DC-DC converter, the ground line is not common to the input-side and the output-side. As a result, a filter (noise filter) including a line bypass capacitor (Y-capacitor) is coupled to the input-side or the output-side of the isolated DC-DC converter.

In this regard, the car-mounted device 1 according to the first embodiment includes the DC-DC converter 11 implemented by a non-isolated DC-DC converter. With a non-isolated DC-DC converter, the ground line is common to the input-side and the output-side. The ground line B is thus usually coupled directly to a metal housing. However, when the ground line B is coupled to a metal housing, the metal housing and the reference ground are short-circuited at high frequencies, so that the Y-capacitor cannot be used (the connection of the Y-capacitor is cut off). As a result, only the CMCC 8 is used to reduce common mode noise, which may result in insufficient control on common mode noise. Hence, the electronic circuit 7 according to the first embodiment includes not only the CMCC 8 but also the first capacitor 9 and the second capacitor 10. The electronic circuit 7 accordingly reduces common mode noise (noise) by using the CMCC 8, and the first capacitor 9 and the second capacitor 10.

To confirm the effects of noise reduction with such a configuration including the CMCC 8, and the first capacitor 9 and the second capacitor 10, conducted emissions were measured in the case of using the electronic circuit 7 according to the first embodiment and the case of using an electronic circuit according to a comparative example. Here, the electronic circuit according to the comparative example has a configuration formed by removing the first capacitor 9 and the second capacitor 10 from the electronic circuit 7 according to the first embodiment so as to short-circuit the metal housing 2 and the ground 5A of the substrate 5 as in Non Patent Document 1.

Figure 4:
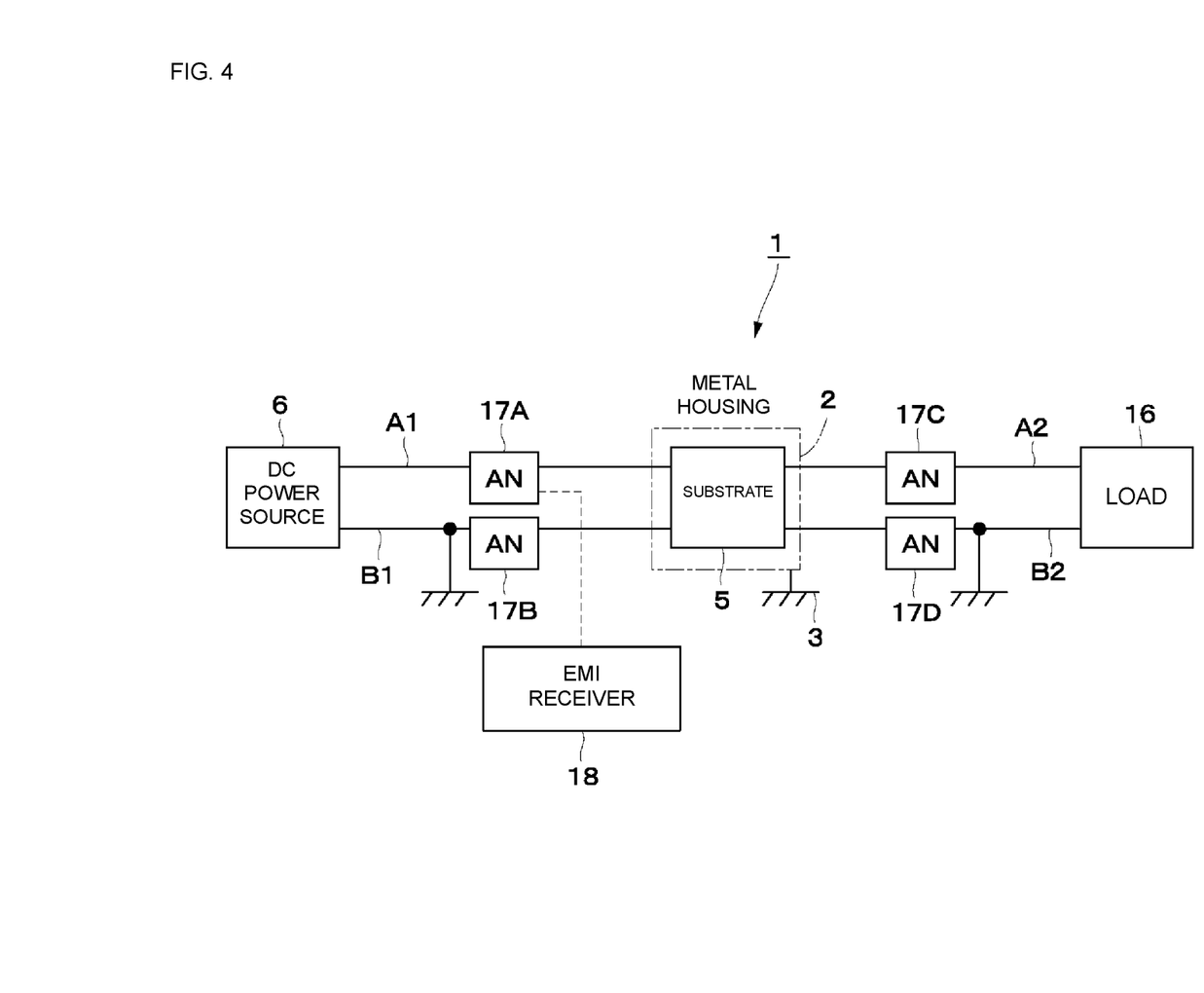
FIG. 4 is a block diagram illustrating a measuring system for measuring conducted emissions in the case of using the electronic circuit in FIG. 1.

Specifically, the measurement of conducted emissions were conducted with a demo board formed to simulate a 48 V/12 V DC-DC converter for a 48-V mild hybrid (48 V-Mild-HEV), by using of the CISPR 25 voltage method. FIG. 4 illustrates the measuring system used for this measurement. The inductance of the CMCC 8 used in this measuring system was about 2 μH, and the capacitance C1 of the first capacitor 9 and the capacitance C2 of the second capacitor 10 were about 100 pF.

As illustrated in FIG. 4, to measure conducted emissions, first to fourth artificial mains networks 17A to 17D ("AN" in FIG. 4) and an EMI receiver 18 are provided; in other words, the first to fourth artificial mains networks 17A to 17D and the EMI receiver 18 are added to the car-mounted device 1 using the electronic circuit 7 coupled to the DC power source 6, and the DC-DC converter 11 and the load 16.

Specifically, the first artificial mains network 17A is disposed at a position in the input-side power line A1 between the DC power source 6 and the substrate 5. The EMI receiver 18 is coupled to the first artificial mains network 17A. The EMI receiver 18 receives noise waves from the first artificial mains network 17A and measure conducted emission. The second artificial mains network 17B is disposed at a position in the input-side ground line B1 between the DC power source 6 and the substrate 5. The third artificial mains network 17C is disposed at a position in the output-side power line A2 between the substrate 5 and the load 16. The fourth artificial mains network 17D is disposed at a position in the output-side ground line B2 between the substrate 5 and the load 16. To leave spaces to add the third artificial mains network 17C and the fourth artificial mains network 17D, the load 16 is spaced apart from the substrate 5. With this structure, the measurement of conducted emission was conducted.

Figure 5:
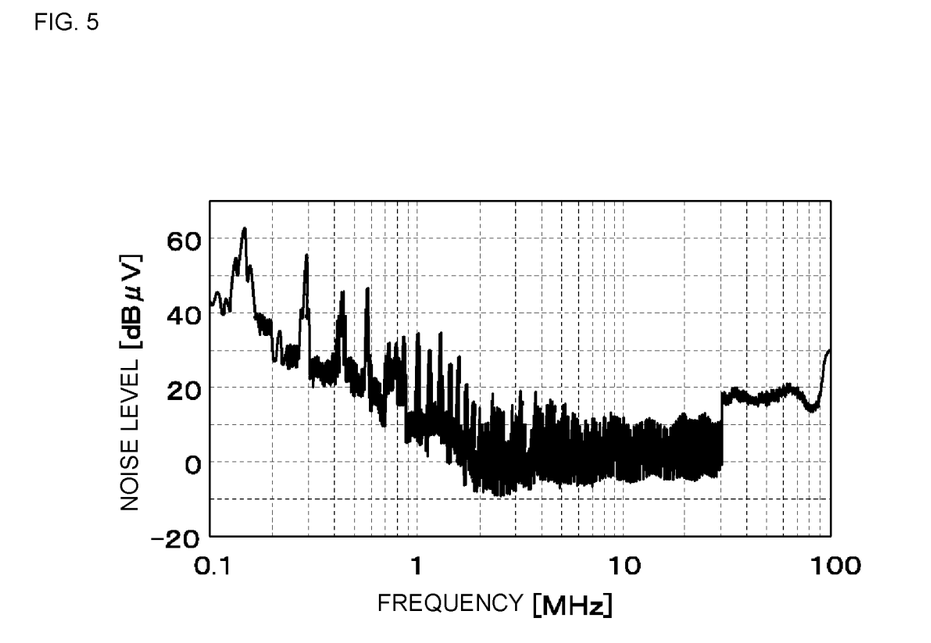
FIG. 5 is a characteristic diagram illustrating the frequency characteristic of noise level in a comparative example.
Figure 6:
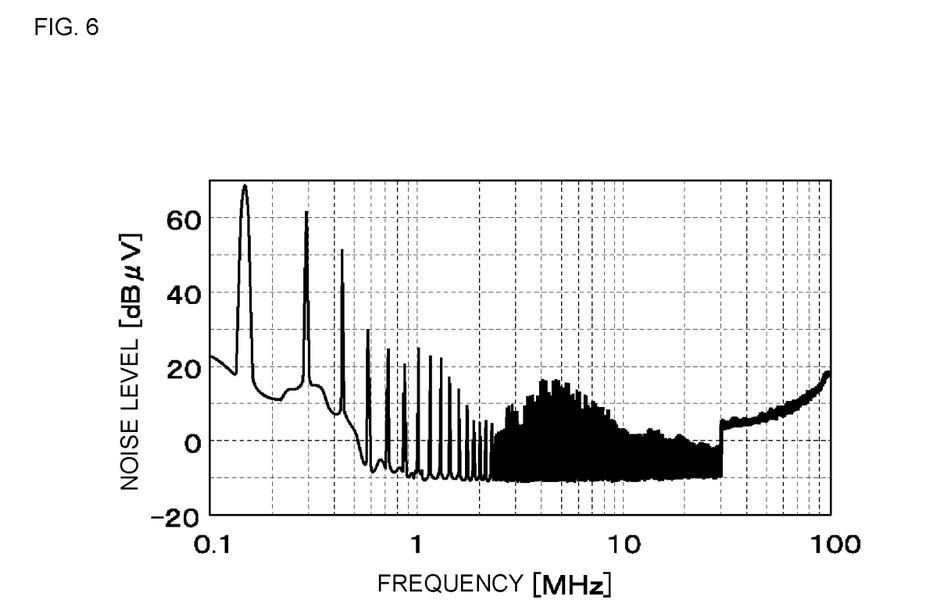
FIG. 6 is a characteristic diagram illustrating the frequency characteristic of noise level in the first embodiment.

Next, FIGS. 5 and 6 illustrate, as the frequency characteristic of noise level, results of the measurement of conducted emissions performed by using the measuring system in FIG. 4, with respect to the comparative example and the first embodiment.

FIG. 5 illustrates, as the frequency characteristic of noise level, results of the measurement of conducted emissions performed by using the measuring system in FIG. 4, with respect to the comparative example. As illustrated in FIG. 5, in the comparative example, the noise level is, for example, about 30 dBμV in a frequency band of 100 MHz (for example, a frequency band for FM radio).

The characteristic changes from a frequency band of 30 MHz with respect to the detected bandwidth. For example, in frequency bands of 30 MHz and lower, the bandwidth is about 9 kHz. By contrast, in frequency bands of 30 MHz and higher, the bandwidth is about 100 kHz.

FIG. 6 illustrates, as the frequency characteristic of noise level, results of the measurement of conducted emissions performed by using the measuring system in FIG. 4, with respect to the first embodiment. As illustrated in FIG. 6, in the first embodiment, the noise level is, for example, about 20 dBμV in a frequency band of 100 MHz.

As illustrated in FIGS. 5 and 6, the electronic circuit 7 according to the first embodiment lowers the noise level by 10 dBμV or more in a frequency band of 100 MHz, when compared to the comparative example. As described above, by using the electronic circuit 7, it is possible to reduce common mode noise (noise) caused between the DC power source 6 and the load 16.

In other words, in the comparative example, which controls common mode noise only by the CMCC 8, only the difference in the original characteristic impedance between wires and the CMCC 8 contributes to noise reduction. By contrast, the first embodiment can achieve the effects of reducing common mode noise by the first capacitor 9 and the second capacitor 10 in addition to the effects of noise reduction by the CMCC 8. This configuration further achieves a synergy effect of decreasing the characteristic impedance of wires by providing the first capacitor 9 and the second capacitor 10, and in turn increasing the effects of noise reduction by the CMCC 8.

As described above, in the electronic circuit 7 according to the first embodiment, the metal housing 2 and the reference ground 3 are coupled to each other, but the ground 5A of the substrate 5 and the metal housing 2 are not directly coupled to each other. The DC-DC converter 11 is coupled to the power line A and also to the ground 5A of the substrate 5 to be consequently coupled to the ground line B. The first capacitor 9 is coupled between the power line A and the metal housing 2. The second capacitor 10 is coupled between the ground line B and the metal housing 2.

With this configuration, the first capacitor 9 can return or reflect the common mode noise flowing in the power line A; the second capacitor 10 can return or reflect the common mode noise flowing in the ground line B. As a result, in the car-mounted device 1 including the DC-DC converter 11, when compared to known technologies, the effects of common mode noise reduction can be enhanced.

The CMCC 8 is disposed at a position across the power line A and the ground line B. With this configuration, by providing the CMCC 8, the impedance of the CMCC 8 increases in the common mode. As a result, it is possible to reduce common mode noise. Additionally, by providing the first capacitor 9 and the second capacitor 10, the characteristic impedance of wires decreases. This in turn facilitates reduction of common mode noise by the CMCC 8, so that a synergy effect is achieved. As has been described above, as compared to known technologies, the effects of common mode noise reduction can be enhanced.

The first capacitor 9 is coupled to the power line A between the CMCC 8 and the DC-DC converter 11, and the second capacitor 10 is coupled to the ground line B between the CMCC 8 and the DC-DC converter 11. With this configuration, the first capacitor 9 and the second capacitor 10 can reduce mainly the common mode noise caused in the DC-DC converter 11. As a result, when compared to known technologies, the effects of common mode noise reduction can be enhanced.

The capacitance C1 of the first capacitor 9 is equal to the capacitance C2 of the second capacitor 10. With this configuration, the common mode noise flowing in the first capacitor 9 is almost equal in level to the common mode noise flowing in the second capacitor 10. Thus, when compared to the configuration in which the capacitance C1 of the first capacitor 9 is different from the capacitance C2 of the second capacitor 10, the effects of common mode noise reduction can be enhanced.

Figure 7:
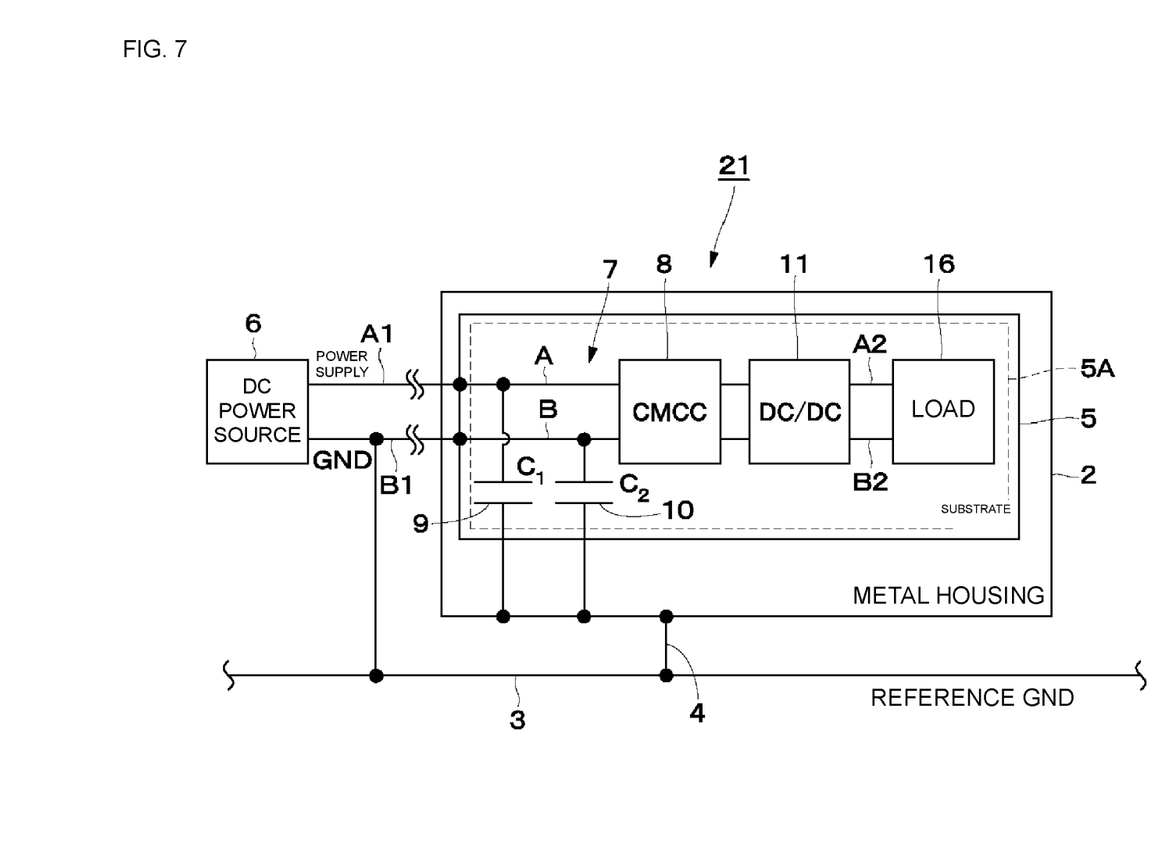
FIG. 7 is a schematic diagram illustrating a car-mounted device using an electronic circuit according to a second embodiment.

Next, FIG. 7 illustrates a car-mounted device using an electronic circuit according to a second embodiment of the present disclosure. The second embodiment is characterized in that the position of the common mode choke coil constituting the electronic circuit according to the first embodiment and the position of the two line bypass capacitors constituting the electronic circuit according to the first embodiment are switched. In the second embodiment, the same configurations as the first embodiment described above are denoted by the same reference characters, and descriptions thereof are omitted.

In the first embodiment described above, the first capacitor 9 and the second capacitor 10 are coupled to the output-side (the DC-DC converter 11 side) of the CMCC 8. This means that the first capacitor 9 is coupled to the power line A between the CMCC 8 and the DC-DC converter 11, and the second capacitor 10 is coupled to the ground line B between the CMCC 8 and the DC-DC converter 11.

By contrast, in the second embodiment, the first capacitor 9 and the second capacitor 10 are coupled to the input-side (the DC power source 6 side) of the CMCC 8. As such, the position of the CMCC 8 and the position of the first capacitor 9 and the second capacitor 10 are opposite in the second embodiment to the first embodiment.

Specifically, in an electronic circuit 21 according to the second embodiment, the first capacitor 9 is coupled to the power line A between the DC power source 6 and the CMCC 8. The second capacitor 10 is coupled to the ground line B between the DC power source 6 and the CMCC 8. The CMCC 8 is disposed closer to the output-side (that is, the load 16 side) than the first capacitor 9 and the second capacitor 10. In the electronic circuit 21, the first capacitor 9 and the second capacitor 10 reduces mainly the common mode noise caused in the DC power source 6. In the second embodiment, the first capacitor 9 may be coupled to the power line A via the input-side power line A1 formed by an electric wire of a wire harness. Similarly, in the second embodiment, the second capacitor 10 may be coupled to the ground line B via the input-side ground line B1 formed by an electric wire of the wire harness.

As described above, the second embodiment can also enhance the effects of common mode noise reduction, similarly to the first embodiment.

Figure 8:
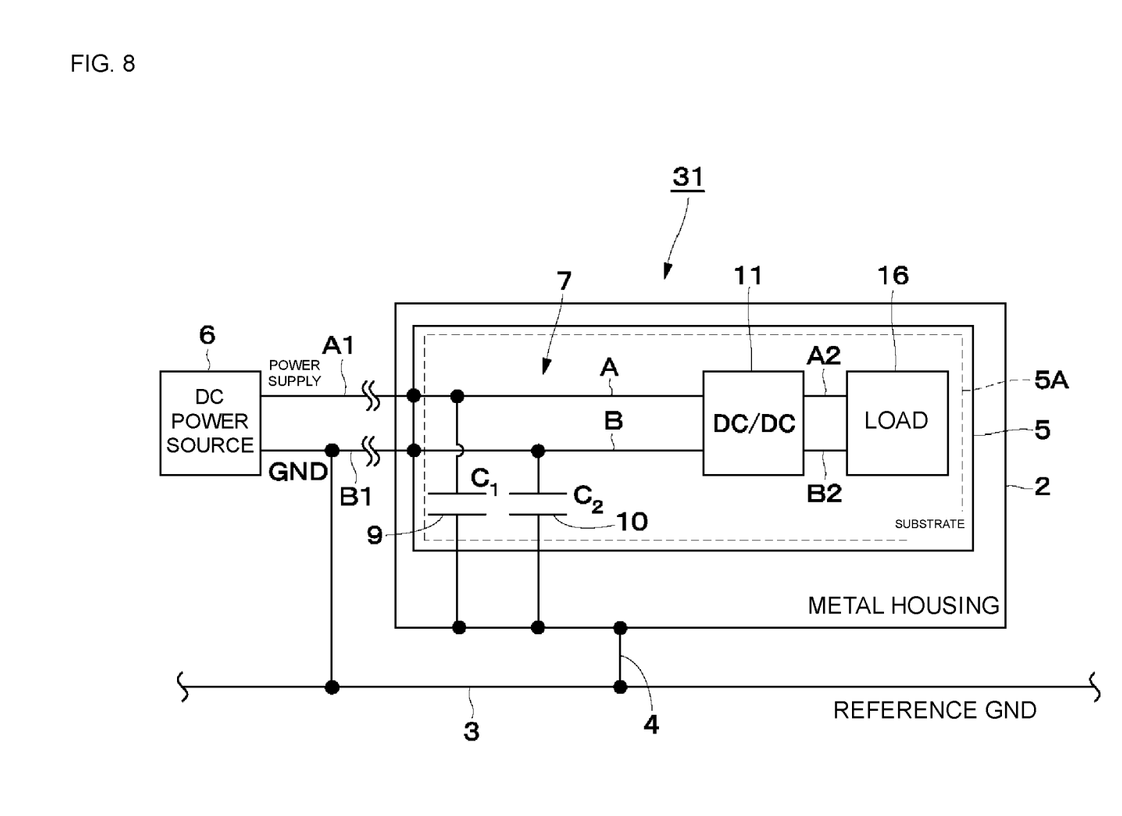
FIG. 8 is a schematic diagram illustrating a car-mounted device using an electronic circuit according to a third embodiment.

Next, FIG. 8 illustrates a car-mounted device using an electronic circuit according to a third embodiment of the present disclosure. The third embodiment is characterized in that the common mode choke coil is removed from the electronic circuit according to the first embodiment. In the third embodiment, the same configurations as the first embodiment described above are denoted by the same reference characters, and descriptions thereof are omitted.

In the first embodiment described above, the electronic circuit 7 includes the CMCC 8. By contrast, in the third embodiment, the CMCC 8 is removed from the electronic circuit 7 according to the first embodiment.

Specifically, in an electronic circuit 31 according to the third embodiment, the first capacitor 9 is coupled to the power line A between the DC power source 6 and the DC-DC converter 11. The second capacitor 10 is coupled to the ground line B between the DC power source 6 and the DC-DC converter 11. With such a configuration without the CMCC 8, it is also possible to reduce common mode noise by the first capacitor 9 and the second capacitor 10.

As described above, the third embodiment can also enhance the effects of common mode noise reduction, similarly to the first embodiment.

The first and second embodiments use as an example the configuration in which the first capacitor 9 and the second capacitor 10 are used as a pair of line bypass capacitors. The present disclosure is not limited to this example, and may have a configuration in which, for example, two pairs of line bypass capacitors (first capacitor and second capacitor) are used. Specifically, the common mode choke coil may be disposed between these two pairs of line bypass capacitors. Specifically, one pair of line bypass capacitors may be coupled closer to the input-side than the common mode choke coil (more specifically, between the DC power source and the common mode choke coil), and the other pair of line bypass capacitors may be coupled closer to the output-side than the common mode choke coil (more specifically, between the common mode choke coil and the non-isolated DC-DC converter).

As the characteristic impedance of wires increases, the effects of noise reduction achieved by the line bypass capacitors enhances. For this reason, when, of the input-side and the output-side, the line bypass capacitors are coupled to one side of a higher characteristic impedance of wires, the effects of noise reduction are enhanced. The characteristic impedance of wires varies depending on, for example, the condition and noise standard of the device.

The specific numerical values presented in the first embodiment described above are mere one example, and the numerical values used as the example should not be construed in a limiting sense.

The embodiments described above are mere examples, and as might be expected, the configurations described in the different embodiments may be partially replaced or combined together.

As electronic circuits embodied in the embodiments described above, for example, the following aspects are contemplated.

In a first aspect, an electronic circuit is configured to be used in a car-mounted device including a substrate, a metal housing, and a non-isolated DC-DC converter. The metal housing is coupled to reference ground. A ground of the substrate is not directly coupled to the metal housing. The non-isolated DC-DC converter is coupled to a power line and also to a ground line coupled to the ground of the substrate. A first capacitor is coupled between the power line and the metal housing. A second capacitor is coupled between the ground line and the metal housing.

With the first aspect, the first capacitor can return or reflect common mode noise flowing in the power line. The second capacitor can return or reflect common mode noise flowing in the ground line. As a result, in the car-mounted device including the non-isolated DC-DC converter, when compared to known technologies, the effects of common mode noise reduction can be enhanced.

In a second aspect, with respect to the first aspect, a common mode choke coil is disposed at a position across the power line and the ground line. With the second aspect, because the common mode choke coil is provided, the impedance of the common mode choke coil increases in the common mode. As a result, it is possible to reduce common mode noise. Additionally, by providing the first capacitor and the second capacitor, the characteristic impedance of wires decreases. This in turn facilitates reduction of common mode noise by the common mode choke coil, so that a synergy effect is achieved. As has been described above, as compared to known technologies, the effects of common mode noise reduction can be enhanced.

In a third aspect, with respect to the second aspect, the first capacitor is coupled to the power line between the common mode choke coil and the non-isolated DC-DC converter. The second capacitor is coupled to the ground line between the common mode choke coil and the non-isolated DC-DC converter. With the third aspect, the first capacitor and the second capacitor can reduce mainly the common mode noise caused in the non-isolated DC-DC converter. As a result, when compared to known technologies, the effects of common mode noise reduction can be enhanced.

In a fourth aspect, with respect to any of the first to third aspects, the capacitance of the first capacitor is equal to the capacitance of the second capacitor. With the fourth aspect, the common mode noise flowing in the first capacitor is almost equal in level to the common mode noise flowing in the second capacitor. Thus, when compared to the configuration in which the capacitance of the first capacitor is different from the capacitance of the second capacitor, the effects of common mode noise reduction can be enhanced.

What is claimed is:

1. An electronic circuit for use in a car-mounted device, the car-mounted device including a substrate, a metal housing, and a non-isolated DC-DC converter, wherein the metal housing is coupled to reference ground, a ground of the substrate is not directly coupled to the metal housing, the DC-DC converter is coupled to a power line from DC power source and a ground line, and the ground line is coupled to the ground of the substrate, and the electronic circuit comprises:

a common mode choke coil disposed at a position across the power line and the ground line;

a first capacitor coupled between the power line and the metal housing, the first capacitor being coupled to the power line between the common mode choke coil and the non-isolated DC-DC converter; and a second capacitor coupled between the ground line and the metal housing, the second capacitor being coupled to the ground line between the common mode choke coil and the non-isolated DC-DC converter, wherein each of the first and second capacitors is directly connected to the metal housing.

2. The electronic circuit according to claim 1, wherein a capacitance of the first capacitor is equal to a capacitance of the second capacitor.

3. The electronic circuit according to claim 1, wherein a capacitance of the first capacitor is different from a capacitance of the second capacitor.

* * * * *